(12) United States Patent
Chami et al.

(10) Patent No.: US 8,440,938 B2
(45) Date of Patent: May 14, 2013

(54) MULTI POLE BATTERY WITH IMPROVED INTERPLATE LEAKPROOFING

(75) Inventors: Marianne Chami, Fontaine (FR); Sébastien Martinet, Grenoble (FR); Djamel Mourzagh, Saint Egréve (FR)

(73) Assignee: Commissariat a l'Energie Atomique, Paris (FR)

(*) Notice: Subject to any disclaimer, the term of this patent is extended or adjusted under 35 U.S.C. 154(b) by 1154 days.

(21) Appl. No.: 12/335,689

(22) Filed: Dec. 16, 2008

(65) Prior Publication Data
US 2009/0159582 A1 Jun. 25, 2009

(30) Foreign Application Priority Data
Dec. 21, 2007 (FR) .................................. 07 60248

(51) Int. Cl.
*H05B 3/00* (2006.01)
*H01M 6/42* (2006.01)

(52) U.S. Cl.
USPC ........................................ 219/200; 429/156

(58) Field of Classification Search .................. 219/200, 219/201, 202, 205, 541; 29/623.1, 623.2, 29/623.4; 429/156, 185, 186
See application file for complete search history.

(56) References Cited

U.S. PATENT DOCUMENTS

| | | | | |
|---|---|---|---|---|
| 3,382,342 | A * | 5/1968 | Dix et al. | 219/85.16 |
| 4,125,684 | A | 11/1978 | Land | |
| 4,204,036 | A | 5/1980 | Cohen et al. | |
| 5,595,839 | A | 1/1997 | Hossain | |
| 7,163,765 | B2 * | 1/2007 | Hosaka et al. | 429/185 |
| 7,547,489 | B2 * | 6/2009 | Nishimura et al. | 429/122 |
| 2004/0091771 | A1 | 5/2004 | Hosaka et al. | |

FOREIGN PATENT DOCUMENTS
JP 2005-310588 11/2005
JP 2006-139994 6/2006

OTHER PUBLICATIONS
English Machine Translation of JP 2005-310588, Apr. 11, 2005.*

* cited by examiner

Primary Examiner — Sang Paik
(74) Attorney, Agent, or Firm — Oblon, Spivak, McClelland, Maier & Neustadt, L.L.P.

(57) ABSTRACT

Double pole battery comprising three electrochemical cells stacked along a longitudinal axis, each cell consisting of an anode, a cathode and an electrolyte placed between the anode and the cathode, a current collector plate electrically connecting an anode of a cell and a cathode of an adjacent cell, a current collector plate on the anode of a cell located at a first longitudinal end of the stack, a current collector plate on the cathode located at a second longitudinal end of the stack, an electrolyte-proof lateral wall surrounding each cell between each pair of successive collector plates, wherein the lateral walls of two adjacent cells are offset transversely one relative to the other relative to the longitudinal axis, in such a way they are not superposed one on the other.

25 Claims, 7 Drawing Sheets

MULTI POLE BATTERY WITH IMPROVED INTERPLATE LEAKPROOFING

TECHNICAL FIELD AND PRIOR ART

The present invention relates to a multipole battery whereof the leakproof properties as regards the electrolyte are improved and to a method for producing such a battery.

There are lithium-ion accumulators that use the pairing of lithium cobalt oxide $LiCoO_2$ for the positive electrode (cathode) and graphite for the negative electrode (anode). These accumulators provide a rated voltage of about 3.6 V, whereas most accumulators of the type Ni—Cd, Ni—MH, etc. provide a rated voltage of about 1.5 V. Additionally, these accumulators provide very high energy density of about 300 to 400 $Wh \cdot l^{-1}$ and about 160 to 200 $Wh \cdot kg^{-1}$, low self-discharge and high durability, of about 500 cycles, or even 800 cycles.

However, current lithium-ion accumulators in the known configuration do not provide good power behaviour, mainly because of the graphite used on the negative electrode.

A proposal has therefore been made for this to be replaced by titanium oxide ($Li_4Ti_5O_{12}$) in a single pole Li-ion cell. However, this accumulator only has a rated voltage of about 2.5 V, and consequently the energy density of the battery is reduced.

To make a battery that retains an energy density comparable to that of conventional Li-ion accumulators, provision is made for a battery to be produced that comprises a plurality of cells in series, which means that the voltage of the overall system can be increased.

Each cell comprises an anode, a cathode and an electrolyte.

To this end, the battery is given a structure in the form of a double pole battery, i.e. a battery that has current collectors providing a connection between an anode of a cell and a cathode of an adjacent cell. Said structure means that the electrical resistance of the assembly can be reduced relative to battery consisting of a plurality of single pole cells connected in series by external connectors.

This double pole structure also means that unnecessary masses and volumes can be reduced.

Consequently, a double pole battery is formed of a stack of cells along a longitudinal axis between which collector plates are interleaved.

Each cell is made leakproof in order to confine the electrolyte which is generally liquid. This leakproofing is obtained by implementing a wall that connects two conductive plates and surrounds each cell.

This leakproofing is of great importance since any electrolyte circulating between two cells due to a leak may cause ion currents or ion bridges to appear, leading to the circulation of $Li^+$ ions, which then causes a general failure of the battery.

This wall is for example implemented by means of an adhesive or a heat-activated polymer material, the adhesive or the polymer being resistant to the electrolyte. The implementation of walls of this kind is described for example in the document U.S. Pat. No. 5,595,839. To activate the polymer, heating means come into contact with the longitudinal ends of the stack.

This method is effective when a reduced number of stacked cells is involved, for example two. But, when a sizeable number of cells are involved, for example greater than or equal to three, which is necessary to obtain the required energy density, this method has a major drawback.

Indeed, the polymer, intended to form the walls of the intermediate cells between the two cells placed at the longitudinal ends of the stack, is heated by conduction. Consequently, to ensure sufficient heating of the polymer of the intermediate cells, considerable heating time is required. But this heating time is too long for the polymer of the end cells. This then creates a disparity between the end cells and the intermediate cells, indeed the end cells have walls that are less high than those of the intermediate cells, since the latter have been heated for longer. Consequently the height of the end cells is less than that of the end cells, and the internal resistance of the battery is therefore increased.

A proposal has been made, for example in the document US 2004/0091771, for using several polymers that have different melting points, their melting point decreasing the further away one gets from the ends of the stack. But this sealing method requires on the one hand, the implementation of several polymers, which means that special attention must be paid when implementing the seals to the installation of the different types of polymer, and that the temperature must be controlled with extreme precision. It frequently happens however that some polymers used to form walls at the centre of the stack creep thereby causing a leak of electrolyte.

This document also proposes the use of a gel type electrolyte, which can prevent leakage in the event of a break in the seal. However, in general terms, an electrolyte in the form of a gel is less effective than a liquid electrolyte.

Also known from the document JP 2005 3100588 is a double pole battery formed by a stack of cells. The cells are made leakproof by heating, but this document provides no indication as to the way in which this heating is carried out. Furthermore, the surface of the active material of each cell varies with the surface of the collector plates. There is then a risk of the active material deteriorating during heating.

The document JP 2006139994 also describes a double pole battery comprising a stack of cells, the cells being such that an area of each of the plates collecting charges from each of the cells is disengaged relative to the area above allowing an improved connection to a cable. The problem of the deterioration of the active material when implementing the lateral seals of the cells is also posed.

It is consequently a purpose of the present invention to propose a double pole battery that provides high rated voltage and high energy density, wherein the electrolytes, preferably liquid ones, of the different cells are safely isolated avoiding a premature failure of the battery.

It is also a purpose of the present invention to propose a straightforward method for producing a double pole battery with high rated voltage and high energy density that can ensure that the electrolyte is confined in the different cells.

DISCLOSURE OF THE INVENTION

The purposes previously set out are achieved via a double pole battery formed by a stack of cells whereof the structure allows distributed heating at individual cell level, and avoiding too great a supply of heat to the end cells.

To this end, provision is made to release an area of at least one collector plate of each cell plumb with the material intended to form the wall.

It has been noted, surprisingly, that the fact of releasing such an area allowed the intermediate walls to be heated effectively without requiring the end walls to be superheated.

In some embodiments, these free areas allow a heating means to come into contact with each collector plate plumb with this material, in order to heat each material individually.

In other words, the joints interposed between the interconnecting plates are offset transversely so that no two couplings find themselves plumb with each other along the stack axis.

The free areas of the collector plates so arranged allow intermediate stacks to be assembled. For example, provision is made to implement assemblies of two cells, and then these assemblies are assembled, a cell is then defined between the two assemblies, by applying the heating means to one of the free areas of one of the end collector plates of one of the assemblies. This method of assembly does not cause a wall coupling already secured to the related collector plates to be heated again.

In one particular embodiment method, the heating means directly accesses the area to be heated of each plate, and heats one jointing without heating the other jointing. Each cell is therefore made leakproof separately, either separately in time, by using the same heating means for all the cells, since it comes into contact with the collector plates one after the other, or separately in the implementation of the means, by providing for a plurality of heating means each dedicated to one cell, all or part of the seals then being implemented simultaneously.

An overheating of a part of the material intended to form the walls of the end cells is thus avoided. The production method is straightforward in that it does not require the implementation of several polymers, additionally the heating temperature can be kept identical for all the cells.

The main subject-matter of the present invention is then a method of manufacturing a double pole battery that comprises at least three cells fitted with four collector plates with different surfaces, comprising the steps of:

a) stacking along a longitudinal axis a succession of collector plates with different surfaces, between each pair of collector plates being placed an anode, an electrolyte, and a cathode in that order along the longitudinal axis and a lateral wall surrounding the anode, the electrolyte and the cathode, the lateral walls of two adjacent cells being offset transversely one relative to the other relative to the longitudinal axis of the stack in such a way that said walls are not superposed one on the other, b) supplying heat by applying a heating means to the free outer periphery of the two end collector plates of the stack, at least plumb with the end lateral walls of the stack, so as to secure each lateral wall to said collector plates which are juxtaposed thereto, and/or to the free outer periphery of the intermediate collector plates of the stack at least plumb with a lateral wall so as to secure said lateral wall to said collector plate and a next collector plate such that the areas to which the heat is applied are not aligned along the longitudinal axis.

Another subject-matter of the present invention is a double pole battery obtained by a method according to the present invention, comprising at least three electrochemical cells stacked along a longitudinal axis, each cell consisting of an anode, a cathode and an electrolyte placed between the anode and the cathode, a current collector plate electrically connecting an anode of a cell and a cathode of an adjacent cell, a current collector plate on the anode of a cell located at a first longitudinal end of the stack, a current collector plate on the cathode located at a second longitudinal end of the stack, an electrolyte-proof lateral wall surrounding each cell between each pair of successive collector plates, each pair of collector plates forming with a lateral wall a leakproof compartment for each cell, the lateral walls of two adjacent cells being offset transversely one relative to the other relative to the longitudinal axis, in such a way that they are not superposed one on the other, the collector plates being of different sizes, wherein said collector plates are stacked in such a way that they strictly increase or strictly decrease in size.

Another subject-matter of the present invention is a double pole battery obtained by a method according to the present invention, comprising at least three electrochemical cells along a longitudinal axis, each cell consisting of an anode, a cathode and an electrolyte placed between the anode and the cathode, a current collector plate electrically connecting an anode of a cell and a cathode of an adjacent cell, a current collector plate on the anode of a cell located at a first longitudinal end of the stack, a current collector plate on the cathode located at a second longitudinal end of the stack, an electrolyte-proof lateral wall surrounding each pair of successive collector plates, each pair of collector plates forming with a lateral wall a leakproof compartment for each cell, the lateral walls of two adjacent cells being offset transversely one relative to the other relative to the longitudinal axis in such a way that they are not superposed one on the other, said battery comprising walls of larger transverse cross-section and walls of smaller transverse cross-section, said walls of larger transverse cross-section and said walls of smaller transverse cross-section following each other alternately, and collector plates of larger transverse cross-section and collector plates of smaller transverse cross-section, the collector plates of larger transverse cross-section and the collector plates of smaller transverse cross-section following each other alternately, in such a way that a wall of larger transverse cross-section is found between a collector plate of larger transverse cross-section and a collector plate of smaller transverse cross-section and between two cells each comprising two lateral walls of smaller transverse cross-section, and that a wall of smaller transverse cross-section is found between a collector plate of larger transverse cross-section and a collector plate of smaller transverse cross-section and between two cells each comprising two lateral walls of larger cross-section.

The walls may to advantage be located plumb with the outside edges of one of the collector plates it connects, which means that contacts on the plate edges can be avoided.

To advantage, the ends of the collector plates are coated with a layer forming an additional barrier to leakage of the electrolyte.

In one embodiment example, the successive lateral walls are of increasing cross-section in a given direction, the successive collector plates having an increasing surface in said given direction.

In another embodiment example, the battery comprises walls of larger cross-section and walls of smaller cross-section, said walls of larger cross-section and said walls of smaller cross-section following each other alternately, and collector plates of larger cross-section and collector plates of smaller cross-section, the collector plates of larger cross-section and the collector plates of smaller cross-section following each other alternately.

The walls are for example made of heat-activated polymer, of the epoxy type, or of adhesive of the polyacrylic or polyurethane type.

The layer deposited on the periphery of the interconnecting plates is, for example, an adhesive of the polyacrylic or polyurethane type.

To advantage, the cathodes are of $LiFePO_4$, and the anodes are of $Li_4Ti_5O_{12}$.

At step b), heating may be applied to the intermediate plates simultaneously so as to secure all the lateral walls to the corresponding collector plates simultaneously, or heating may be applied to the intermediate plates successively for each lateral wall.

Advantageously, prior to step a), provision is made for a step a0) for producing an assembly of a collector plate and an anode, an assembly of a collector plate and a cathode and assemblies of collector plates with an anode on one face and a cathode on another face.

Subsequent to step a0) and before step a), provision may be made for a step of cutting the collector plates to the required surface.

The collector plates are cut, for example, to give collector plates of decreasing surface.

Step b) is to advantage carried out first on the plates with smaller surfaces.

The inventive manufacturing method may also comprise a step following step b) of depositing a layer of material resistant to the electrolyte on the free external periphery of each collector plate and in contact with the lateral walls.

Another object of the present invention is a heating device for implementing the method according to the present invention that comprises a heating surface able to be applied to the entire outer periphery of each collector plate simultaneously or successively.

The device may comprise a plurality of surfaces arranged in steps each intended to be applied simultaneously to an outer periphery of a plate or a surface of adjustable size so that it can adapt to all the outer peripheries in a stack.

BRIEF DESCRIPTION OF THE DRAWINGS

The present invention will be better understood with the help of the following description and the appended drawings wherein.

DETAILED DISCLOSURE OF PARTICULAR EMBODIMENTS

In the present specification, the expressions "lateral wall of larger cross-section" and "lateral wall of smaller cross-section" are used to describe the relative dimensions of two successive lateral walls, a lateral wall of larger cross-section defines with its inner face a central area of larger cross-section than the outer surface defined by the outer face of the lateral wall of smaller cross-section in such a way that there is no superposition between the two successive lateral walls, in the longitudinal direction. Actually a lateral wall of the larger cross section has inner dimensions larger than the outer dimensions of the lateral wall of the smaller cross section, therefore the successive laterals walls do not overlap.

Figure 1:
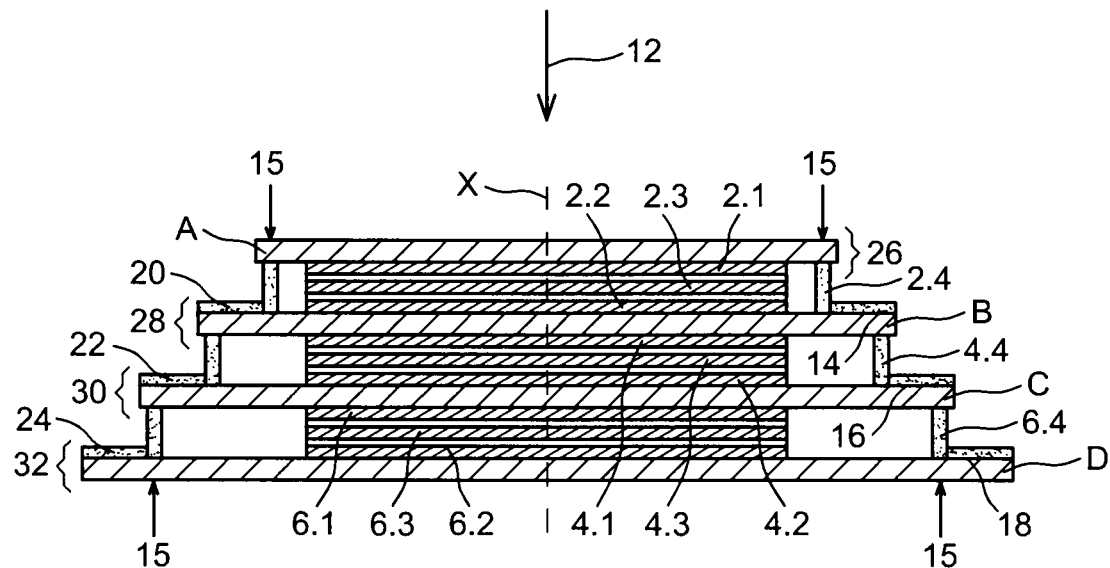
FIG. 1 is a longitudinal cross-section view of a first embodiment example of a stack of cells of a double pole battery according to the present invention.

In FIG. 1 can be seen a first embodiment example of a stack of cells for a double pole battery according to the present invention.

We shall call "cell" in the present specification, an assembly comprising an anode 2.1 in an electrically conductive material, a cathode 2.2 in an electrically conductive material and an electrolyte 2.3 placed between the anode and the cathode.

Throughout the specification, we shall consider the case of a stack of cells rectangular in shape. This stack has a longitudinal axis X. But a stack of circular or oval cross-section or of any other shape does not depart from the context of the present invention.

Advantageously, the electrolyte is liquid and is contained in a dielectric micro-porous material with which the anode and the cathode are in contact.

In FIG. 1 can be seen a stack of a plurality of cells 2, 4, 6 electrically connected in series. In the example shown, only three cells are stacked.

The cell 2 is formed of an anode 2.1 in an electrically conductive material, a cathode 2.2 in an electrically conductive material and an electrolyte 2.3 placed between the anode and the cathode.

The anode 2.1 is carried by a current collector plate A, the latter being therefore in electrical contact with the anode 2.1, and the cathode 2.2 is carried by a current collector plate B, the latter being in electrical contact with the cathode 2.2.

The cell 4 is formed of an anode 4.1 in an electrically conductive material, a cathode 4.2 in an electrically conductive material and an electrolyte 4.3 placed between the anode and the cathode.

The anode 4.1 is carried by the collector plate B on a face opposite the one receiving the cathode 2.2.

The cathode 4.2 is carried by a collector plate C and is in electrical contact with it.

The cell 6 is formed of an anode 6.1 in an electrically conductive material, a cathode 6.2 in an electrically conductive material and an electrolyte 6.3 placed between the anode and the cathode.

The anode 6.1 is carried by the collector plate C on a face opposite the one receiving the cathode 4.2.

The cathode 6.2 is carried by a collector plate D.

The collector plates B and C provide the electrical connection in series of the cells 2, 4, 6.

The cathodes are for example of $LiFePO_4$, and the anodes are for example of $Li_4Ti_5O_{12}$.

The collector plates A, B, C, D are to advantage made of aluminium, which allows the battery mass to be reduced significantly, indeed the density of aluminium is three times less than that of copper. But it is clearly understood that collectors made of copper or any other electrically conductive material do not depart from the context of the present invention.

Each cellule 2, 4, 6 is surrounded by a wall 2.4, 4.4, 6.4 that confines the electrolyte 2.3, 4.3, 6.3 in the cell and prevents any electrolyte circulating between the cells. In the example described, each wall surrounds the cell, and therefore has the shape of a hollowed out rectangle.

These walls are for example based on a heat-activated polymer of the epoxy type, or on an adhesive, of the acrylic or polyurethane type.

According to the present invention, the walls are such that two successive walls are not superposed along the axis X.

In the example shown in FIG. 1, the walls are of generally rectangular cross-section hollowed out at the centre thereof.

The walls in fact form joints, whereof the general shape is that of a rectangular frame surrounding the cell.

Provision is made for the wall of a downstream cell in the direction indicated by the arrow 12 to have internal dimensions larger than those of the upstream wall. More particularly, provision is made for the length and width of the hollowed out space of the downstream wall to be larger than the length and outer width of the upstream wall.

Thus, the wall 2.4 and the wall 4.4 are not superposed when considered in the direction of the arrow 12.

Likewise, the walls 4.4 and 6.4 are not superposed.

Furthermore, in the example shown, the conductive plates A, B, C also have an increasing surface in the direction of the arrow 12.

The outer dimensions of each wall 2.4, 4.4, 6.4 are to advantage such that they are substantially equal to those of the collector plate of smaller dimensions among the two collector plates between which it extends. Shoulders 14, 16, 18 are therefore defined on the outer periphery of the larger surface plates of each cell.

This stepped embodiment prevents distortion of the plate edges and consequently the risks of short-circuiting.

Thus, the stack shown in FIG. 1 is substantially in the shape of a stepped pyramid.

The walls 4.2, 6.2, are located underneath the shoulders 14, 16 in FIG. 1; it is then possible to apply a heating means to each shoulder 14, 16 to heat the material constituting the wall, and to secure it to the two collector plates.

Thus, the operation to confine the electrolyte is performed on each cell and not only at the longitudinal ends of the stack.

Advantageously, provision is made to use electrodes of the same size for all the cells, which simplifies manufacture, and reduces the costs thereof. Only the size of the collector plates varies. Moreover, the surface of the anode/electrolyte/cathode stack, also designated as active material, is to advantage invariable for the entire stack, in such a way as to have a strict stack of all the stacks relative to each other. This means that the active material of each cell can be kept away from the area where the heating is applied to make the leakproof seals. Additionally, this strict stack means that a battery can be obtained that has improved performance, relative to a battery whereof the size of the active material might vary from one cell to the next.

Provision is made to fix an electrode on a collector plate, and then to cut the collector plate to the required dimension. Thus, only one initial size of collector plate, and only one electrode size, is used.

Through the structure of the present inventive stack, the shoulders 14, 16 further form an additional barrier in the event of leakage in the walls 2.4, 4.4. Indeed, in the event of leakage, the electrolyte should run along the shoulder, thereby further reducing the risk of electrolyte circulating from one cell to the next.

Advantageously, provision is made to coat entirely the shoulders 14, 16, 18 with layers 20, 22, 24 respectively of material resistant to the electrolyte, for example of the adhesive type, such as a polyacrylic or a polyurethane.

The layers 20, 22, 24 are in contact by their inner periphery with the outer face of the walls 2.4, 4.4, 6.4.

In the event of leakage between the walls 2.4, 4.4, 6.4 and the lower collector plate B, C, D, the layer 20, 22, 24 forms an additional obstacle to electrolyte leakage.

In the example shown, the dimensions of plate D are larger than those of plate C, and define a shoulder. However, provision might be made for the plates C and D to be of the same size. Conversely, this flange to advantage allows the application of a layer of adhesive, so as to further increase the degree of leakproofing.

Provision may be made to increase the number of stacked cells to reach the required voltage and energy density, with the surface of the collector plates increasing in a given direction of the stack.

We will now explain the method of manufacturing such a stack.

For example, firstly assemblies formed by a collector plate and an electrode are made and assemblies with electrodes on the two faces of a collector plate.

Thus to make the stack in FIG. 1 are formed:
- an assembly 26 comprising the collector plate A and the anode 2.1,
- an assembly 28 comprising the collector plate B, the cathode 2.2 and the anode 4.1,
- an assembly 30 comprising the collector plate C, the cathode 4.2 and the anode 6.1,
- an assembly 32 comprising the collector plate D and the cathode 6.2.

For example, the plates at this stage in their production all have the same surface.

Next, the collector plates, A, B, C, D are cut in such a way that the surfaces of the plates A, B, C and D are increasing in that order.

Next, the assemblies 32, 30, 28, 26 are stacked in that order by interposing the electrolyte between the anode and the cathode of each cell.

To this end, the assembly 32 is placed first.

Then the wall 6.4 is deposited on the collector plate C around the cathode 6.2, the wall is in the shape of a hollowed-out rectangle made in a film, for example of polymer. To advantage, this film has substantially the thickness of the cell, i.e. the thickness of the anode-electrolyte-cathode stack, so that geometric distortions are avoided.

The electrolyte is then placed on the cathode 6.2, provision can be made to place the electrolyte before the wall 6.4.

The assembly 30 is then deposited on the assembly 32 and the wall 6.4. Then the wall 4.4 and the electrolyte, the assembly 28, the wall 2.4 and the electrolyte and finally the assembly 26, are deposited.

Next, the walls are sealed on the collector plates with which they are in contact.

To this end, and by means of the particular inventive configuration, by heating the end collector plates A and B of the stack, a uniform temperature distribution is obtained in the walls 2.4, 4.4 and 6.4. In particular, the wall 4.4 is sufficiently heated to secure itself to the collector plates B and C, without an excessive quantity of heat being supplied to the walls 2.4 and 6.4. Sealing then occurs without distortion.

This embodiment method is applied to a stack of more than three cells, but is particularly advantageous in the case of a stack of three cells.

The heating means is, for example, formed by two elements intended to come into plane contact with the end collector plates A and B at least plumb with the walls 2.4 and 6.4. These two elements have, for example, the frame shape corresponding to that of the walls. To advantage, heating the central part of the cell plumb with the anode-electrolyte-cathode stack is avoided.

It is also possible to implement an individual seal, making provision for the heating means to come into contact on the periphery of each collector plate plumb with the wall.

To this end, provision is made to apply the heating means to the end plates and the intermediate collector plates, simultaneously or successively.

In this particular case, the quantity of heat supplied by the heating means is transmitted by conduction to the material of the walls 2.4, 4.4, 6.4 which melts and fixes itself to the collector plates as it cools.

The heating means 60 has, in this case, preferably a form that ensures a surface contact with the shoulders and ensures a contact over the entire shoulder. Thus in the example shown of a stack 62 in the shape of a stepped pyramid, the heating means 60 comprises at least one surface formed by a rectangular outline.

Figure 6:
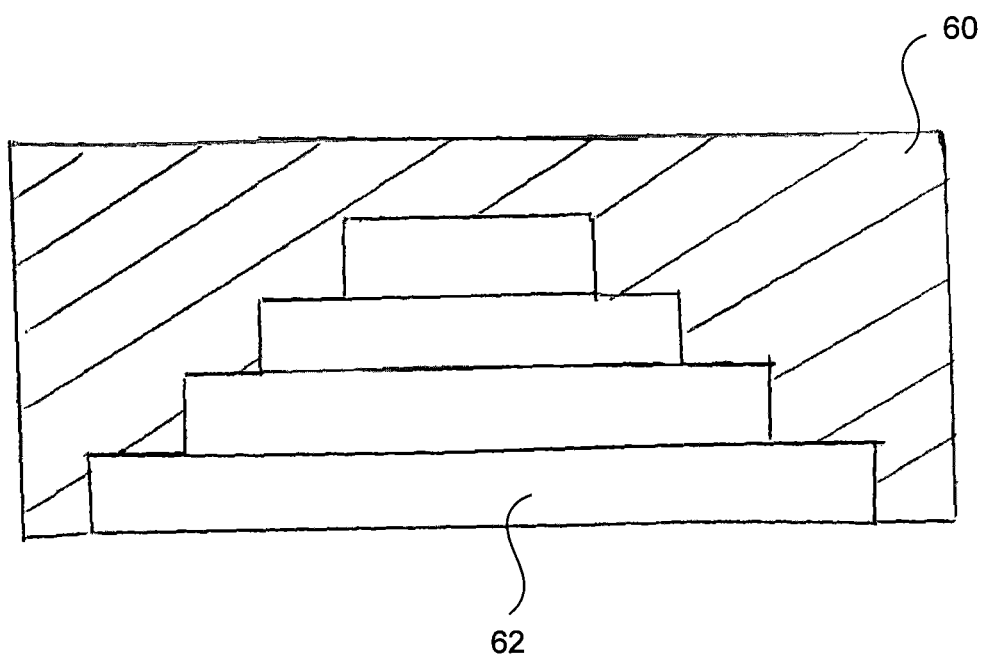
FIG. 6 is an example of a heating means for a stack of cells.
Figure 7:
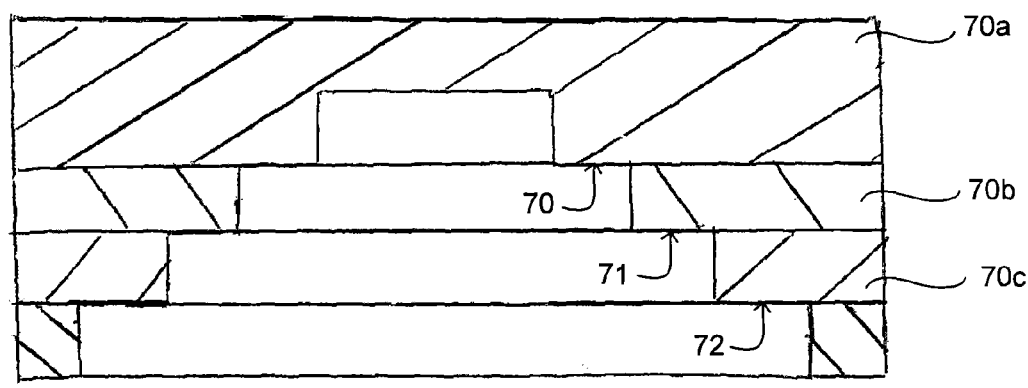
FIG. 7 is an example of a heating means for a stack of cells.
Figure 8:
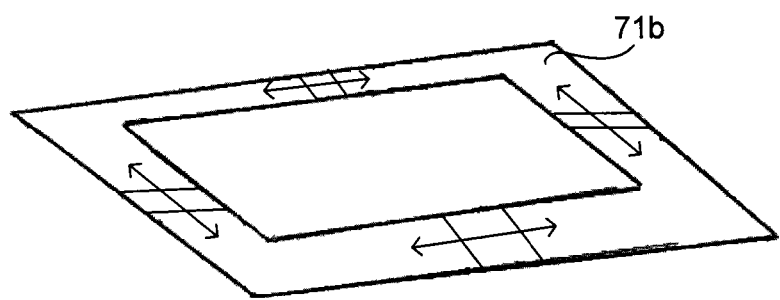
FIG. 8 is an example of the heating means in FIG. 7.

To implement the particular method above, the heating means may have an internal shape corresponding to the outer shape of the stack, in other words with a plurality of steps corresponding to the shoulders of the stack (see FIG. 6), or it may comprise a single heating surface (each of 70a, 71a and 72a) which is applied successively to each shoulder (70, 71, and 72), in this case this surface (71b for example) is adjustable in such a way that it can be adjusted to the dimensions of the shoulders (see FIG. 8).

Sealing is generally carried out without exerting any axial stress on the stack. But provision could be made for such stress to be applied.

Thus, by means of the invention, each wall is heated sufficiently to seal it to the two collector plates it connects, and is not subject to any unnecessary superheating.

Finally, and advantageously, the layers 20, 22, 24 are deposited on the peripheries of the collector plates, further reducing the risks of leakage.

In this example, the layers 20, 22, 24 coat the entire outer periphery of the collector plates, but provision could be made to implement layers that only partially cover the outer periphery of the plates. However, as we shall see in the example shown in FIG. 3, this total coverage means that the risks of short-circuiting between plates can be avoided.

In the method described above, all the plates, the electrolytes and the walls are stacked before sealing is carried out. The sealing could however be carried out as the plates are stacked. In this event, the invention further allows any additional heating of a wall to be avoided when it has already been sealed at a previous step.

Figure 2A:
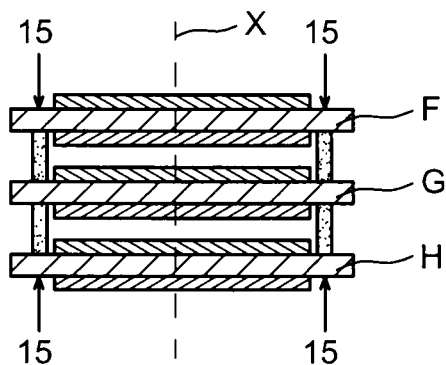
FIGS. 2A and 2B show intermediate steps in the production of the stack in FIG. 2.
Figure 2:
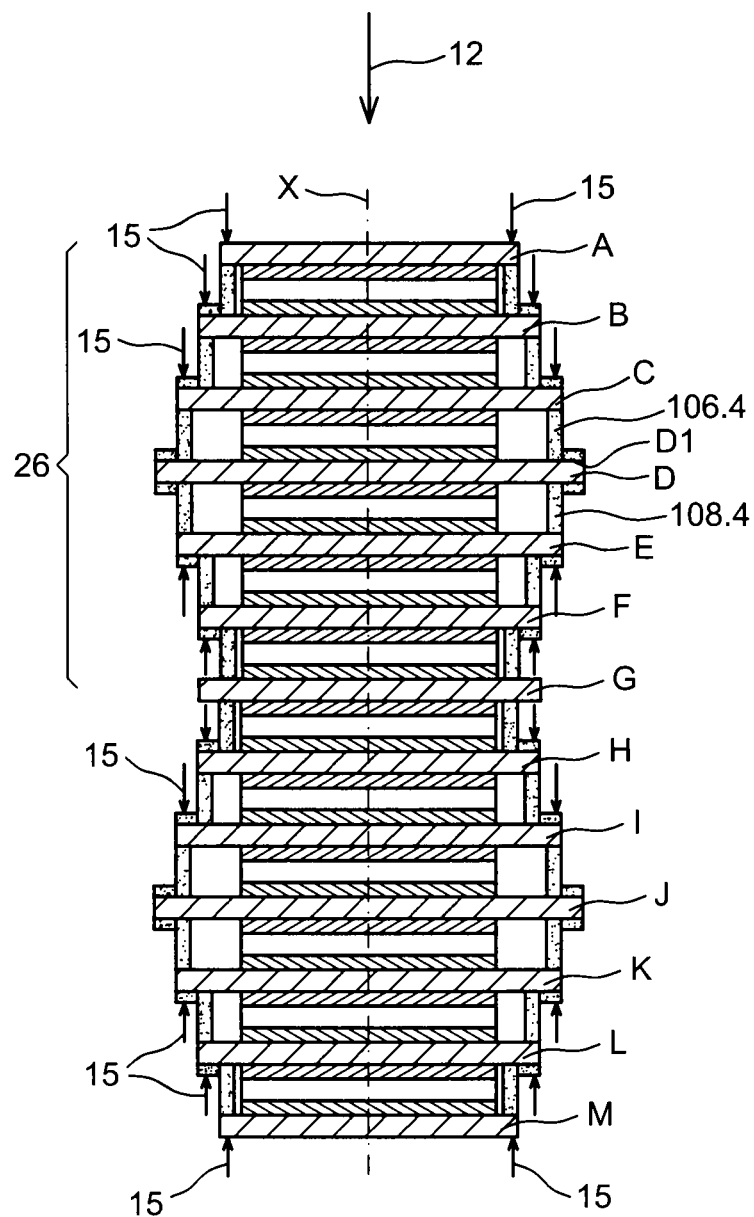
FIG. 2 is a longitudinal cross-section view of a second embodiment example of a stack of cells of a double pole battery according to the present.

In FIG. 2, can be seen a second embodiment example of a stack of cells for a double pole battery, wherein a pattern is repeated in order to limit the maximum cross-section of the collector plates. In the example shown, the stack comprises twelve cells and thirteen interconnecting plates denoted A to M from top to bottom.

The stack in FIG. 2 consists of a succession of two identical patterns 26.

The pattern 26 comprises a stack of six cells connected in series by collector plates A, B, C, D, E, F, G. The walls connecting the plates A and B, B and C, and C and D in that order are of increasing cross-section in the direction of the arrow 12, and the walls connecting the plates D and E, E and F, F and G are, in that order, of decreasing cross-section. The pattern 26 therefore has, substantially, seen from the front, the outline of a regular hexagon. Additionally, the plates A, B, C and D are of increasing surface in that order, and the plates D, E, F and G are of decreasing surface in that order.

In the example shown, the walls 106.4, and 108.4 are aligned seen in the direction of the arrow 12. However, these walls are each associated with a different shoulder, so the material making up each of these walls may be heated separately on the associated shoulder.

The outer periphery D1 of the collector plate D which is placed at the centre of the stack is coated on these two faces with a layer 28 to improve leakproofing.

By means of this configuration, there is provided for each wall, an area on a conductive plate with which the heating means symbolized by the arrow 15 can come into contact, limiting the transverse space requirement of the stack.

As for the cell in FIG. 1, a size of active material is preferentially chosen that is identical for all cells, the anode/electrolyte/cathode assemblies being stacked so as to be aligned relative to each other.

We shall now describe the method of implementing this stack.

As is shown in FIG. 2A, the first step is to implement the central stack formed by the plates F, G and H. These three plates have equal surfaces.

The stack is implemented in a way similar to that described in respect of the stack in FIG. 1, by interposing the walls cut out a film between two collector plates.

Next the heating means is applied to the outer periphery of the plates F and G, symbolized by the arrows 15.

Figure 2B:
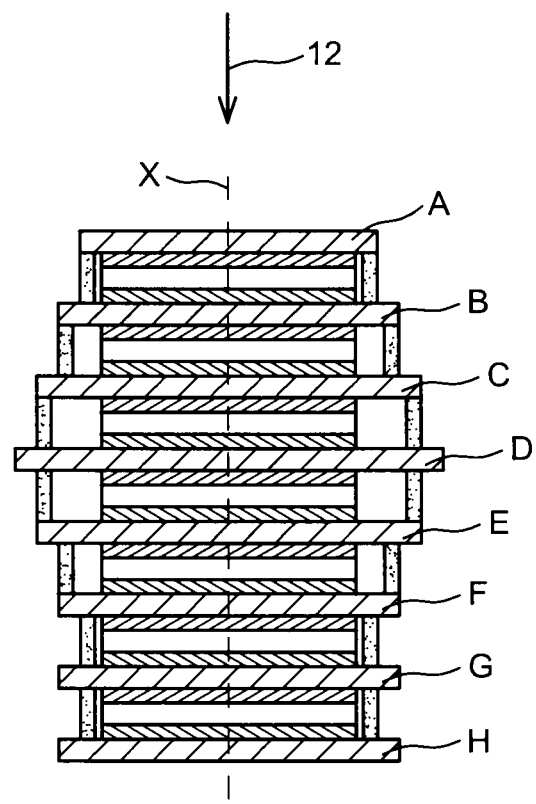

The plates continue to be stacked upwards as shown in FIG. 2B, sealing being carried out by individually heating at the free peripheral ends of the collector plates A, B, C, E and F, as for the stack in FIG. 1.

When the collector plate A has been sealed, the partial stack is turned over so that the plate A forms the lower end of the stack. Stacking the plates fitted with the electrodes and sealing then continues.

Figure 3:
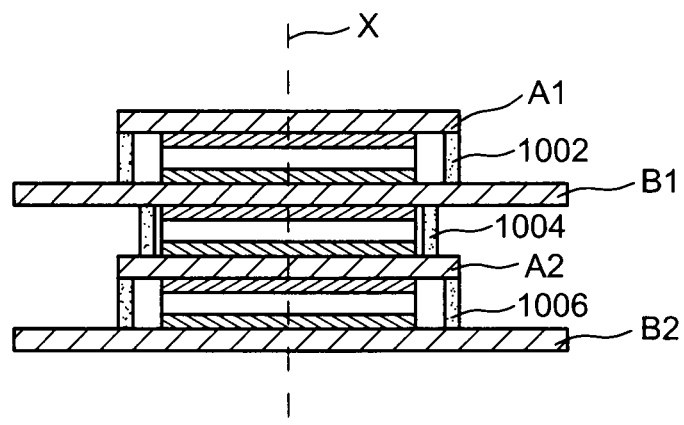
FIG. 3 is a longitudinal cross-section view of a third embodiment example of a stack of cells of a double pole battery according to the present invention.

In FIG. 3, can be seen another embodiment example of a present inventive stack, comprising two types of collector plate of different surface.

The stack thus comprises alternate plates A, with a smaller surface, and plates B, with a larger surface.

In this embodiment example, sealing is carried out as the collector plates are stacked and not at the end as in the example in FIG. 1.

According to the present invention, the walls of two successive cells are not superposed thereby preventing, when sealing the second wall, heating the first sealed wall again.

The walls are denoted by the reference numbers from 1002 to 1006.

For example, the collector plates A1, B1 and the wall 1002 are stacked. This assembly is sealed by applying the heating means to one of the plates A1, B1 plumb with the wall 1002.

Next the plate A2 and the wall 1004 are stacked, the latter not being plumb with the wall 1002. When sealing, the heating means is applied to the plate A2 plumb with the wall 1004 which is not plumb with the wall 1002, and the latter is not therefore subjected again to heating or then only to reduced heating.

The stacking of plates and walls and sealing continues as and when.

Next, the adhesive is deposited on the free outer periphery of the plates so as to form a second leakproof barrier.

This layer has, additionally, the advantage of providing electrical insulation between two collector plates. Indeed when sealing and given the low degree of thickness of the plates, of about 20 μm to 70 μm, their outer peripheries are distorted and may come into contact with each other and cause a short-circuit. But, through the presence of the adhesive layer, this short circuiting is avoided even in the event of contact between the plates.

As in respect of the cell in FIG. 1, a size of active material is preferentially chosen that is identical for all the cells, with the anode/electrolyte/cathode assemblies being stacked so as to be aligned relative to each other.

By way of example, we can give the following values for the dimensions of a stack of cells according to the present invention.

The walls are about 1 mm high. The capacity of the battery is proportionate to the surface of the electrodes. Collector plates are therefore conceivable that have a surface varying from $cm^2$ to $m^2$.

Figure 4:
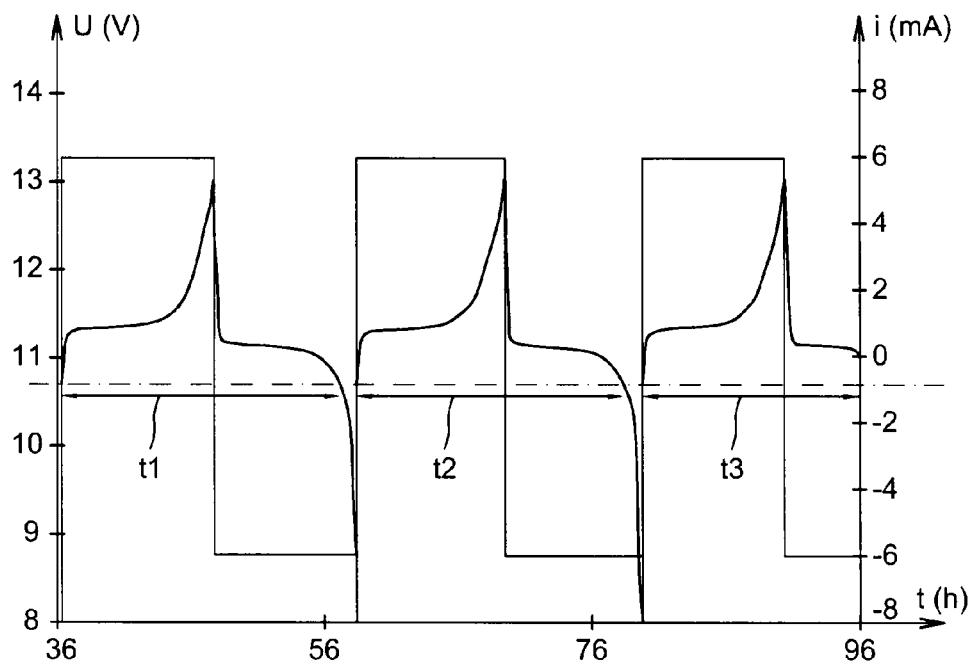
FIG. 4 is a graphic representation of a cycling curve for a battery according to the present invention, showing the changes in voltage and intensity as a function of time over three charge/discharge cycles.

In FIG. 4 can be seen a graph showing the change in voltage U in Volts and in intensity i in mA at the terminals of the battery as a function of time in hours, known as the cycling curve, in order to demonstrate the absence of ion current in the present inventive battery, and therefore the leakproofing of the walls to the electrolyte. The battery, according to the present invention, used in this case comprises six cells of size increasing between $22 \times 20$ $cm^2$ and $16 \times 14$ $cm^2$.

This curve represents several charge and discharge cycles of the battery.

In order to verify whether any ion current is being produced in the assembly during cycling, the charge and discharge times for one and the same applied system are noted. If they are identical, the double pole battery is operating properly, there is therefore no displacement of electrolyte from one cell to the next, and the leakproofing of the compartments is therefore effective.

As may be noted, the charge-discharge times t1, t2, t3 of the three cycles are identical, this being the time measured between two transitions to zero intensity over one and the same cycle. Consequently, the method for producing a battery according to the present invention allows the presence of leakage and therefore the appearance of ion current to be effectively avoided.

A battery according to the present invention may comprise a plurality of stacks connected in parallel or in series, to reach the required rated voltage and energy density.

Figure 5:
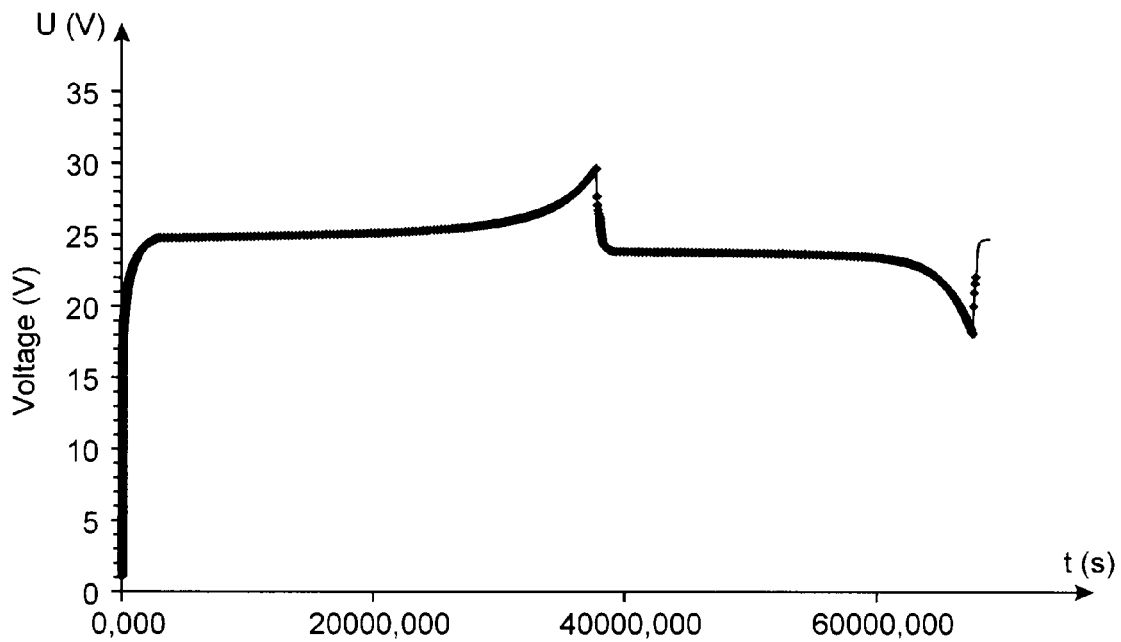
FIG. 5 is a graphic representation of the changes in voltage in V as a function of the time in seconds at the terminals of a double pole battery according to the present invention consisting of a stack of thirteen cells.

In FIG. 5 can be seen a graphic representation of the changes in the voltage U in Volts at the terminals of a double pole battery according to the present invention as a function of the time t in seconds, comprising a stack of thirteen cells connected in series, each cell having a unit voltage of 1.9V. The battery then has a voltage of 24.7 V and a capacity of 0.7 Ah.

The voltage of 24V at the terminals of the cell can be guaranteed for at least a period of 60,000 seconds.

We have not described the stack environment, but this is conventional and known to the man skilled in the art.

The present inventive battery may in particular be used as a source of electric power in a electric motor vehicle, thereby potentially cutting the use of fossil fuels.

The invention claimed is:

1. A method of manufacturing a double pole battery comprising at least three cells fitted with four collector plates with different surfaces, comprising the steps of:
   a) stacking along a longitudinal axis a succession of the collector plates with different surfaces, between each pair of collector plates being placed an anode, an electrolyte, and a cathode in that order along the longitudinal axis and a lateral wall surrounding the anode, the electrolyte and the cathode, among lateral walls of two adjacent cells, one of the lateral walls being a lateral wall of larger transverse cross-section and the other one being a lateral wall of smaller transverse cross-section, the lateral wall of larger transverse cross-section delimitating with its inner face a central zone, which has an area larger than an outer area which is delimited by an outer face of the lateral wall of smaller transverse cross-section, in such manner that the lateral walls of two adjacent cells are not superposed one on the other, and
   b) supplying heat by applying a heating device to at least one of a free outer periphery of two end collector plates of a stack created by the staking, at least plumb with end lateral walls of the stack, so as to secure each lateral wall to said collector plates which are juxtaposed thereto, or to the free outer periphery of intermediate collector plates of the stack at least plumb with a lateral wall so as to secure said lateral wall to said collector plate and a next collector plate in such a way that areas to which the heat is applied are not aligned along the longitudinal axis.

2. The manufacturing method as claimed in claim 1, wherein, at step b), the heat is supplied to the intermediate collector plates simultaneously in order to secure all the lateral walls to corresponding collector plates simultaneously.

3. The manufacturing method as claimed in claim 1, wherein the heat is supplied to the intermediate collector plates successively in respect of each lateral wall.

4. The manufacturing method as claimed in claim 3, wherein step b) is carried out first on the collector plates with smaller surfaces.

5. The manufacturing method as claimed in claim 1, wherein prior to the step a), the method comprises a step a0) of implementing an assembly of a collector plate and an anode, an assembly of a collector plate and a cathode and assemblies of collector plates with an anode on one face and a cathode on another face.

6. The manufacturing method as claimed in claim 5, wherein, subsequent to the step a0) and before the step a), of the method comprises cutting the collector plates to a required surface.

7. The manufacturing method as claimed in claim 5, wherein the collector plates are cut so as to give collector plates of decreasing surface.

8. The manufacturing method as claimed in claim 1, comprising a step following the step b) of depositing a layer of material resistant to the electrolyte on the free outer periphery of each collector plate and in contact with the lateral walls.

9. The method claimed in claim 1, wherein the step b) includes using a heating surface configured to be applied to an entire outer periphery of each collector plate simultaneously or successively.

10. The method claimed in claim 9, wherein the using includes using a plurality of heating surfaces arranged in steps that are applied simultaneously to an outer periphery of a plate.

11. The method of claim 10, wherein the heating surfaces each have a surface of adjustable size, and the method includes adapting the surfaces of adjustable size so that they are adapted to each of the outer peripheries of the stack, respectively.

12. A double pole battery, comprising:
   at least three electrochemical cells stacked along a longitudinal axis, each cell including an anode, a cathode and an electrolyte placed between the anode and the cathode, a current collector plate electrically connecting an anode of a cell and a cathode of an adjacent cell, a current collector plate on the anode of a cell located at a first longitudinal end of the stack, a current collector plate on the cathode located at a second longitudinal end of the stack, an electrolyte-proof lateral wall surrounding each cell between each pair of successive collector plates, each pair of collector plates forming with a lateral wall a leakproof compartment for each cell, along the longitudinal axis of a succession of collector plates with different areas, between each pair of collector plates being placed an anode, an electrolyte, and a cathode in that order along the longitudinal axis and a lateral wall surrounding the anode, the electrolyte and the cathode, among the lateral walls of two adjacent cells, one of the lateral walls being a lateral wall of larger transverse cross-section and the other one being a lateral wall of smaller transverse cross-section, the lateral wall of larger transverse cross-section delimitating with its inner face a central zone, which has an area larger than an outer area which is delimitated by an outer face of the lateral wall of smaller transverse cross-section, in such manner that the lateral walls of two adjacent cells are not superposed one on the other, the collector plates being of different sizes, wherein said collector plates are stacked in such a way that they strictly increase or strictly decrease in size.

13. The double pole battery as claimed in claim 12, comprising at least a first sub-assembly of cells comprising collector plates that strictly increase in size and a second sub-assembly of cells comprising collector plates that strictly decrease in size.

14. The double pole battery as claimed in claim 13, comprising several first and second sub-assemblies following each other longitudinally in an alternating way.

15. The double pole battery as claimed in claim 12, wherein the walls are located plumb with outer edges of one of the collector plates to which the walls connect, respectively.

16. The double pole battery as claimed in claim 12, wherein ends of the collector plates are coated with a layer forming an additional barrier to electrolyte leakage.

17. The double pole battery as claimed in claim 16, wherein said layer is a polyacrylic or polyurethane adhesive.

18. The double pole battery as claimed in claim 12, wherein the walls are made of heat-activated polymer, or of polyacrylic or polyurethane adhesive.

19. The double pole battery as claimed in claim 12, wherein the cathodes are of $LiFePO_4$, and the anodes are of $Li_4Ti_5O_{12}$.

20. A double pole battery comprising
at least three electrochemical cells stacked along a longitudinal axis,
each cell consisting of an anode, a cathode and an electrolyte placed between the anode and the cathode, a current collector plate electrically connecting an anode of a cell and a cathode of an adjacent cell, a current collector plate on the anode of a cell located at a first longitudinal end of the stack, a current collector plate on the cathode located at a second longitudinal end of the stack, an electrolyte-proof lateral wall surrounding each cell between each pair of successive collector plates, each pair of collector plates forming with a lateral wall a leakproof compartment for each cell, the lateral walls of two adjacent cells being offset transversely one relative to the other relative to the longitudinal axis in such a way that there is no superposition between them, said battery comprising lateral walls of larger transverse cross-section and walls of smaller transverse cross-section, a lateral wall of larger transverse cross-section delimitating with its inner face a central zone, which has an area larger than an outer area which is delimitated by an outer face of the lateral wall of smaller transverse cross-section, said walls of larger transverse cross-section and said walls of smaller transverse cross-section following each other alternately, and collector plates of larger transverse cross-section and collector plates of smaller transverse cross-section, the collector plates of larger transverse cross-section and the collector plates of smaller transverse cross-section following each other alternately, in such a way that a wall of larger transverse cross-section is found between a collector plate of larger transverse cross-section and a collector plate of smaller transverse cross-section and between two cells each comprising two lateral walls of smaller transverse cross-section, and that a wall of smaller transverse cross-section is found between a collector plate of larger transverse cross-section and a collector plate of smaller transverse cross-section and between two cells each comprising two lateral walls of larger cross-section.

21. The double pole battery as claimed according to claim 20, wherein the walls are located plumb with outer edges of one of the collector plates to which the walls connect, respectively.

22. The double pole battery as claimed according to claim 20, wherein ends of the collector plates are coated with a layer forming an additional barrier to electrolyte leakage.

23. The double pole battery as claimed in claim 22, wherein said layer is a polyacrylic or polyurethane adhesive.

24. The double pole battery as claimed according to claim 20, wherein the walls are made of heat-activated polymer, or of polyacrylic or polyurethane adhesive.

25. The double pole battery as claimed according to claim 20, wherein the anodes are of $LiFePO_4$, and the cathodes are of $Li_4Ti_5O_{12}$.

* * * * *